(12) United States Patent
Nakayama et al.

(10) Patent No.: US 8,663,376 B2
(45) Date of Patent: Mar. 4, 2014

(54) SURFACE TREATMENT SOLUTION FOR AUTODEPOSITION COATING OF METALLIC MATERIAL AND AUTODEPOSITION COATING TREATMENT METHOD

(75) Inventors: Takaomi Nakayama, Hiratsuka (JP); Hideki Takakuwa, Tokyo (JP); Takahiro Fujino, Tokyo (JP)

(73) Assignee: Henkle AG & Co. KGaA, Dusseldorf (DE)

( * ) Notice: Subject to any disclaimer, the term of this patent is extended or adjusted under 35 U.S.C. 154(b) by 68 days.

(21) Appl. No.: 12/957,750

(22) Filed: Dec. 1, 2010

(65) Prior Publication Data

US 2011/0135913 A1 Jun. 9, 2011

Related U.S. Application Data

(63) Continuation of application No. PCT/JP2009/059457, filed on May 22, 2009.

(30) Foreign Application Priority Data

Jun. 7, 2008 (JP) ................................ 2008-149993

(51) Int. Cl.
| | |
|---|---|
| C04B 9/00 | (2006.01) |
| C25D 3/20 | (2006.01) |
| C08G 18/28 | (2006.01) |
| C08G 18/22 | (2006.01) |

(52) U.S. Cl.
USPC ....... 106/14.21; 106/1.27; 524/590; 524/591; 427/327; 428/335; 205/270

(58) Field of Classification Search
USPC ...................... 106/14.21, 1.27; 524/590, 591; 427/327; 428/335; 205/270
See application file for complete search history.

(56) References Cited

U.S. PATENT DOCUMENTS

| | | | | |
|---|---|---|---|---|
| 4,017,334 A | * | 4/1977 | Matsushima et al. | ......... 428/470 |
| 4,338,140 A | * | 7/1982 | Reghi | ............................ 148/247 |
| 5,868,820 A | * | 2/1999 | Claffey | ...................... 106/14.44 |
| 6,525,112 B1 | * | 2/2003 | Bammel | ....................... 523/404 |
| 2008/0230395 A1 | * | 9/2008 | Inbe et al. | ..................... 205/261 |

FOREIGN PATENT DOCUMENTS

| | | |
|---|---|---|
| JP | A 47-32039 | 11/1972 |
| JP | A 48-13428 | 2/1973 |
| JP | A 53-116240 | 10/1978 |
| JP | A 61-168673 | 7/1986 |
| JP | A 8-92540 | 4/1996 |
| JP | 2000-262967 | * 9/2000 |
| JP | 2000-262967 A | * 9/2000 |
| JP | 2002-501100 | 1/2002 |
| JP | 2002-266081 | 9/2002 |
| JP | 2003-176449 | 6/2003 |
| JP | 2003-301274 | 10/2003 |
| JP | 2005-15676 | 1/2005 |
| JP | 2008-13756 | 1/2008 |
| WO | WO 2006/126560 | 11/2006 |
| WO | WO 2009/147960 A1 | * 12/2009 |

OTHER PUBLICATIONS

International Search Report for PCT/JP2009/059457, dated Jun. 23, 2009, 2 pages.

* cited by examiner

*Primary Examiner* — Tae H Yoon

(74) *Attorney, Agent, or Firm* — Mary K. Cameron

(57) ABSTRACT

A surface treatment solution for autodeposition coating treatment of a metallic material, which is an aqueous solution comprising at least one tannin, at least one crosslinking agent having a crosslinking group capable of thermosetting reaction with a phenolic hydroxyl group and/or a phenolic nucleus, ferric ions, soluble type elemental fluorine, and an oxidizing agent, wherein the solids mass concentration ratio of the tannin to the crosslinking agent is in the range of from 1:1 to 1:10, the molar concentration of the soluble type elemental fluorine is at least 3-fold the molar concentration of the ferric ions, and the pH of the solution is from 2 to 6. The surface treatment solution allows shorter process length as compared with conventional coating processes, generates less environmentally harmful by-products such as sludge, has excellent throwing power at the interior of a pocket structure, does not use environmentally harmful components such as chromium compounds, has corrosion resistance, and allows overcoating of a baking finish on the obtained coating film.

19 Claims, No Drawings

SURFACE TREATMENT SOLUTION FOR AUTODEPOSITION COATING OF METALLIC MATERIAL AND AUTODEPOSITION COATING TREATMENT METHOD

CROSS-REFERENCE TO RELATED APPLICATIONS

This application is a continuation under 35 U.S.C. Section 365(c) and 120 of International Application No. PCT/JP2009/059457, filed May 22, 2009 and published on Dec. 10, 2009 as WO 2009/147960, which claims priority from Japanese Patent Application No. 2008-149993 filed Jun. 7, 2008, which are incorporated herein by reference in their entirety.

FIELD OF THE INVENTION

The present invention relates to a surface treatment solution for autodeposition coating treatment, which is intended for depositing, by way of a chemical reaction, an organic coating film having sufficient corrosion resistance per se and allowing overcoating of a coating material, on the surface of an iron-based metallic material that is required to have corrosion resistance, and which may be provided with an overcoating of a coating material depending on the usage, such as a metallic material used in automotive bodies, automotive parts, steel household furnishings and domestic electric appliances; a method for autodeposition coating treatment; and a metallic material having an autodeposition coating film.

BACKGROUND OF THE INVENTION

With the exception of some products with special applications and materials, most of the industrial products that use metallic materials are available in a coated state. The purpose of coating is not only to enhance the aesthetic appearance but also to prevent oxidation, that is, corrosion, which metals are destined to go through. Here, the coating materials that are used for metallic materials can be classified into various types depending on the coating method or the components, and a coating material is selected in accordance with the performance required of the material to be coated, or the usable coating method. Here, when the material to be coated has a complicated structure and requires a high level of corrosion resistance, such as in the case of an automotive body, it is important to secure a coating film thickness at the interior of a pocket structure, which is a characteristic called throwing power.

A method commonly used to secure corrosion resistance in the interior of a pocket structure involves a combination of a zinc phosphate treatment, which is a chemical conversion treatment for coating foundation, and a cationic electrodeposition coating. In both of these methods, since the chemical conversion treatment and coating are performed by immersing the material to be coated in a treatment bath, the chemical conversion treatment solution and the coating material can be brought into contact even with the interior of a pocket structure. However, the zinc phosphate treatment process includes hot water rinsing → preliminary degreasing → degreasing → multistage water rinsing (normally 2 to 3 stages) → surface conditioning → coating film chemical conversion → multistage water rinsing (normally 2 to 3 stages) → ion-exchanged water rinsing, and the cationic electrodeposition coating process includes electrodeposition coating → multistage water rinsing (normally 3 to 5 stages) → ion-exchanged water rinsing → and baking. Thus, the treatment processes are very long, and for example, in the case of an automotive body, the process length may exceed 200 m.

In the zinc phosphate treatment process, as it is conventionally known, the generation of an iron phosphate sludge, which occurs as a side reaction of the coating film deposition reaction, cannot be avoided, and an improvement is desired from the viewpoint of environmental problems. Furthermore, although there have been improvements in the current coating materials for cationic electrodeposition, from the standpoint of the mechanism in which the coating film is deposited as a result of electrolysis and the coating film is thrown due to the electrical resistance of the deposited coating, there is an unavoidable problem that there occurs a difference in the thickness between the film on the outer panel where the coating film is initially deposited, and the film at the interior of the pocket structure where the coating film is deposited later.

Thus, technologies have been suggested for long, which are intended to solve the problem of the generation of iron phosphate sludge and the problem of the coating film thickness at the interior of pocket structures, while attempting to shorten the process, by depositing an organic coating film through a chemical reaction. Such compositions are called as autodeposition compositions, self-precipitating compositions, or self-deposition compositions.

For example, Patent Document 1, cited below, relates to an autodeposition composition using a vinylidene chloride copolymer. Since vinylidene chloride resins are excellent in the moisture-proofing properties, moisture resistance and gas barrier properties, when used in coating film formation, the resins have a remarkable action of suppressing corrosion. However vinylidene chloride resins have very low heat resistance, as is well known. Thus, Patent Document 1 discloses that heat resistance can be improved by copolymerizing a vinylidene chloride monomer with a comonomer, for example, an acrylic comonomer, and thereby inserting a thermally stable comonomer into the chain. However, even if a stable moiety is inserted into the chain, it is impossible to fundamentally improve the low heat resistance of the basic vinylidene chloride structure. Therefore, the autodeposition technology utilizing vinylidene chloride cannot be used for metallic materials that are used in an environment subject to the exposure to high temperatures, and also has a problem that overcoating by baking finish cannot be achieved on a coating film formed by autodeposition.

Many autodeposition compositions have also been disclosed, which do not utilize vinylidene chloride. Examples of the resin component that is used in autodeposition compositions in addition to vinylidene chloride, include, as cited in Patent Documents 2, 3 and 4, cited below, styrenebutadiene, acrylic polymers and acrylic copolymers, polyvinyl chloride, polyethylene, polytetrafluoroethylene, acrylonitrile butadiene, and urethane resins.

However, in all of these methods, the corrosion resistance of the autodeposition coating films was markedly low as compared with the coating films using vinylidene chloride. Thus, in order to enhance the corrosion resistance, there has been a need to perform, after the autodeposition coating process, a post-treatment using chromium compounds, the use of which is currently restricted due to concerns about environmental problems, as disclosed in Patent Document 3, cited below.

Thus, in recent years, an autodeposition composition combining an epoxy resin and a crosslinking agent has been proposed, as disclosed in Patent Document 5, cited below. However, when the inventors of the present invention conducted an investigation to verify the effects of the aforementioned invention, the inventors found that the autodeposition coating film utilizing an epoxy resin still cannot be said to have sufficient corrosion resistance, and the proposed autodeposition coating film has markedly low adhesiveness to solvent coating materials and has a fatal flaw that overcoating cannot be achieved thereon.

Patent Documents 6 and 7, cited below, disclose aqueous coating compositions containing a water-dispersible phenolic resin and a softening agent polymer, characterized by being capable of self-attachment on a metal support. However, because the autodeposition coating films prior to baking as obtainable by these methods contain large amounts of water, the coating films cannot be rinsed with water before baking. Accordingly, there will be no problem if the material to be coated is a flat plate; however, in the case of a material having a pocket structure, because the coating material remaining in the interior of the pocket structure cannot be washed out, serious flaws occur, which markedly affect the corrosion resistance, such as swelling and peeling of the coating film after baking.

Surface treatment technologies utilizing tannic acid have also been proposed in the past. For example, Patent Document 8, cited below, discloses a method of forming a protective coating film for metal surfaces, which includes treating a metal surface with a treatment solution obtained by adding 0.1 to 20% by weight of tannin into an aqueous solution of a water-soluble or water-dispersible organic polymer. Furthermore, Patent Document 9, cited below, discloses a chemical conversion treatment solution for pre-coating treatment containing titanium hydrofluoride, zirconium hydrofluoride, silica, tannic acid and a water-dispersible organic resin, characterized in that the mass ratio of tannic acid to the water-dispersible organic resin is 100:0.5 to 100:15, and the mass ratio, in terms of dry mass, of the inorganic substances to the total mass of tannic acid and the water-dispersible organic resin is 1:0.5 to 1:2.

Both of these methods are related to a dry-in-place type surface treatment of performing film formation by squeezing the treatment solution adhering to the surface of a metallic material to be treated, with a roll or the like to control the amount adhered, and then drying the surface. Accordingly, in the methods disclosed in the aforementioned documents, the film thickness thus obtainable is very small, and since these methods do not involve a method of depositing a coating film by way of a chemical reaction, it has been impossible to deposit a coating film at the interior of a pocket structure.

Furthermore, Patent Document 10, cited below, discloses a urethane-based aqueous adhesive composition which has a urethane polymer obtainable by polymerizing (A) a polyisocyanate compound, (B) a polyol compound having two or more hydroxyl groups, and (C) a functional compound having two or more active hydrogen atoms that are capable of reacting with isocyanate groups and having one or more hydrophilic groups selected from a carboxyl group and a sulfonyl group, dispersed in water, while the composition is characterized in that a polytannic acid compound is added to the composition in an amount of 0.5 to 20 parts by weight relative to 100 parts by weight of the urethane polymer. However, the current patent document relates to an adhesive composition, and the document discloses nothing about the treatment solution composition or method in connection with an autodeposition composition.

In addition, Patent Document 11, cited below, discloses a surface treated metal material obtained by subjecting a metal material to a treatment solution containing a water-soluble thermosetting resin, a crosslinking agent and a polyhydric phenol compound, wherein the water-soluble thermosetting resin is selected from a polyester resin, an epoxy resin and a urethane resin; the crosslinking agent is selected from an amino resin and an isocyanate; the polyhydric phenol compound is tannic acid and is contained in an amount of equal to or greater than 0.1% by mass and equal to or less than 50% by mass relative to the total solids content; and the surface treated steel plate is a Zn-based plated steel plate. However, the current patent document is also related to a Dry-in-place type surface treatment, and the metallic material that is considered as the subject of treatment is limited to a Zn-based plated steel plate.

Accordingly, in the prior art, it has been impossible to provide an autodeposition coating film which allows shortening of the process length as compared with a coating process based on the combination of zinc phosphate treatment and electrodeposition coating, does not generate any environmentally harmful by-products such as sludge, has excellent throwing power at the interior of a pocket structure, does not use environmentally harmful components such as chromium compounds, has corrosion resistance, and allows overcoating of a baking finish on the obtained coating film. It has also been impossible with the conventional technologies utilizing tannin, to obtain a large film thickness that would make it possible to substitute electrodeposition coating.

Patent Document 1: Japanese Patent Application Laid-Open (JP-A) No. 60-58474
Patent Document 2: JP-A No. 47-32039
Patent Document 3: JP-A No. 48-13428
Patent Document 4: JP-A No. 61-168673
Patent Document 5: JP-A No. 2003-176449
Patent Document 6: Japanese Patent Application National Publication (Laid-Open) No. 2002-501100
Patent Document 7: Japanese Patent Application National Publication (Laid-Open) No. 2002-501124
Patent Document 8: JP-A No. 53-116240
Patent Document 9: JP-A No. 2002-266081
Patent Document 10: JP-A No. 8-92540
Patent Document 11: JP-A No. 2003-301274

SUMMARY OF THE INVENTION

An object of the present invention is to solve the problems of the prior art. That is, the object of the invention is to provide an autodeposition coating film which allows shortening of the process length as compared with a coating process based on the combination of zinc phosphate treatment and electrodeposition coating, does not generate any environmentally harmful by-products such as sludge, has excellent throwing power at the interior of a pocket structure, does not use environmentally harmful components such as chromium compounds, has corrosion resistance, and allows overcoating of a baking finish on the obtained coating film, and which can substitute the conventional electrodeposition coating, by utilizing tannin, which is environmentally harmless.

Means for Solving the Problems

The inventors of the present invention conducted a thorough investigation on the means for solving the problems as described above, and as a result, the inventors finally invented a surface treatment solution for autodeposition coating treatment, an autodeposition coating treatment method, and a metallic material having an autodeposition coating film, which have not existed in the prior art.

Specifically, the present invention provides a surface treatment solution for autodeposition coating treatment of a metallic material, the surface treatment solution being an aqueous solution containing at least one tannin, at least one crosslinking agent having a crosslinking group capable of thermosetting reaction with a phenolic hydroxyl group and/or a phenolic nucleus, ferric ions, soluble type elemental fluorine, and an oxidizing agent, characterized in that the solids mass concentration ratio of the tannin to the crosslinking agent is in the range of from 1:1 to 1:10, the molar concentration of the soluble type elemental fluorine is at least 3-fold the molar concentration of the ferric ions, and the pH of the liquid is from 2 to 6.

The at least one crosslinking group capable of thermosetting reaction is preferably an isocyanate group, and the at least one crosslinking agent is preferably a polyfunctional blocked isocyanate obtained by adding at least 2 moles of a polyisocyanate in which the isocyanate group at one end is blocked in advance with a blocking agent, relative to 1 mole of a polyol.

The polyol in the at least one crosslinking agent preferably has at least one molecule with the bisphenol A structure, and/or the at least one crosslinking agent is preferably a self-emulsifying type blocked isocyanate which uses a polyether polyol as the polyol.

The concentration of at least one of the tannin is preferably 1% to 5% by mass as the solids concentration in the aqueous solution.

The oxidizing agent is preferably at least one selected from perchloric acid, hypochlorous acid, dissolved oxygen, ozone, permanganic acid and hydrogen peroxide.

The oxidation-reduction potential measured using a platinum electrode is preferably from 300 mV to 500 mV.

It is also preferable that the surface treatment solution for autodeposition coating treatment of the present invention contain at least one selected from the group consisting of cerium fluoride, yttrium fluoride, aluminum fluoride and strontium fluoride, in an amount in the range of 0.1% to 10% by mass relative to the total solids concentration of tannin and the crosslinking agent.

Furthermore, the present invention provides a method for autodeposition coating treatment of a metallic material, characterized by bringing a metallic material having its surface cleaned in advance by degreasing and water rinsing, into contact with any one of the surface treatment solutions for autodeposition coating treatment described above, subsequently removing any excess treatment solution adhering to the surface of the metallic material, through water rinsing, and then performing a baking treatment to thereby thermally harden the coating film.

Furthermore, the metallic material used in the present invention is preferably an iron-based metallic material.

Furthermore, the present invention provides an autodeposition coated metallic material having an autodeposition coating layer deposited according to the method described above, characterized in that the thickness of the autodeposition coating layer obtainable after hardening by baking is 10 to 50 μm.

Here, the meanings of the various terms used in the claims and the specification of the present invention will be explained. With regard to the term "ferric ion", there are no particular limitations on the form of existence in the treatment solution for surface treatment as long as the ferric ion is an ion represented by $Fe^{3+}$, and this represents, for example, $Fe^{3+}$ or the ion in a state of being coordinated with a ligand. Examples of elemental fluorine coordinating a ferric ion include $FeF^{2+}$, $FeF_2^+$, and $FeF_3$. With regard to the term "soluble type elemental fluorine", there are no particular limitations on the form, such as the molecular state or the ionic state, but the soluble type elemental fluorine excludes elemental fluorine which is contained in a salt that does not dissolve in the surface treatment solution for autodeposition coating treatment of the present invention and is present in the form of solid particle. Therefore, the "soluble type elemental fluorine" means elemental fluorine in general that is supplied by fluorine-containing compounds such as hydrogen fluoride and/or salts thereof into the autodeposition coating surface treatment solution and is dissolved in the treatment solution. Furthermore, the concentration of the "soluble type elemental fluorine" is the total molar concentration of the various forms of dissolved elemental fluorine that are present in the system. For example, the elemental fluorine supplied by the fluorine-containing compounds can adopt a dissociated form such as F, HF or $HF_2^-$ depending on the pH of the aqueous solution, and the concentration of the dissolved elemental fluorine as used herein is the total molar concentration of the entirety of F in the aqueous solution. Furthermore, in the case where fluorine forms a complex with a ferric ion, the complex contains the "ferric ion" and also contains the "soluble type elemental fluorine". The term "tannin" is a generic name for a group of plant-derived compounds having phenolic hydroxyl groups and exhibiting a nature capable of tanning hides, and tannins are roughly classified into hydrolyzable tannins and condensed tannins.

Effects of the Invention

When the method for autodeposition coating treatment of the present invention is used, it is possible to shorten the process length as compared with the process of the prior art which includes hot water rinsing → preliminary degreasing → degreasing → multistage water rinsing (normally 2 to 3 stages) → surface conditioning → chemical conversion of coating film → multistage water rinsing (normally 2 to 3 stages) → ion-exchanged water rinsing → electrodeposition coating → multistage water rinsing (normally 3 to 5 stages) → ion-exchanged water rinsing → baking, that is, a coating process based on the combination of zinc phosphate treatment and electrodeposition coating. Moreover, according to the method of the present invention, environmentally harmful by-products such as sludge are not produced, and the autodeposition coating treatment bath does not use harmful components such as chromium compounds, so that the method has little influence on the environment. In addition, since the autodeposition coating film of the present invention is very excellent in the corrosion resistance of the coating film by itself and is also excellent in the throwing power at the interior of a pocket structure, the autodeposition coating film is also effective in improving the corrosion resistance of an object to be coated having a complicated structure. In addition, the autodeposition coated metallic material of the present invention can have a baking finish overcoated on the autodeposition coating film. Therefore, the autodeposition coating film can be used in combination with various coatings.

When an isocyanate is used as the crosslinking agent, there is obtained an effect that an autodeposition coating film having superior corrosion resistance can be formed.

When a polyfunctional blocked isocyanate is used as the crosslinking agent, there is obtained an effect that an autodeposition coating film having still superior corrosion resistance can be formed.

When a compound having at least one molecule with the bisphenol A structure is used as the crosslinking agent, there is obtained an effect that an autodeposition coating film having still superior corrosion resistance can be formed.

When the crosslinking agent is a self-emulsifying type blocked isocyanate which uses polyether polyol as the polyol, there is obtained an effect that a larger film thickness can be secured.

When the concentration of at least one of the tannin is 1% to 5% by mass as the solids concentration in the aqueous solution, the autodeposition coating film acquires a film thickness that is sufficient to obtain corrosion resistance, and the amount of consumption of the components can be suppressed.

When the solids mass concentration ratio of the at least one tannin and the at least one crosslinking agent is set at from 1:1 to 1:10, there is obtained an effect that a uniform external appearance of the autodeposition coating film is obtained, and corrosion resistance is also enhanced.

When at least one compound selected from perchloric acid, hypochlorous acid, dissolved oxygen, ozone, permanganic acid and hydrogen peroxide is used as the oxidizing agent, there is obtained an effect that the autodeposition reaction is accelerated without impairing the stability of the treatment solution for autodeposition coating treatment.

When the oxidation reduction potential measured with a platinum electrode is set at from 300 mV to 500 mV, the oxidizing agent is present in an amount that is sufficient to oxidize all of the iron ions present in the bath into ferric ions and to maintain the oxidation state. Thus, the deposition reaction of the autodeposition film is accelerated, and the unstabilization of the autodeposition coating film treatment solution due to the presence of ferrous ions can be suppressed.

When at least one compound selected from the group consisting of cerium fluoride, yttrium fluoride, aluminum fluoride and strontium fluoride is incorporated in an amount in the range of 0.1% to 10% by mass relative to the total solids concentration of tannin and the crosslinking agent, there is obtained an effect that the corrosion resistance, and particularly resistance to warm salt water, of the autodeposition coating film is enhanced.

According to the method for autodeposition coating treatment related to the present invention, when the treatment solution according to the present invention is used, there is obtained an effect that an autodeposition coating film having superior corrosion resistance can be formed.

When the metallic material is an iron-based metallic material, there is obtained an effect that it becomes easier to form an autodeposition coating film, and an autodeposition coating film having excellent corrosion resistance can be formed.

DETAILED DESCRIPTION OF THE INVENTION

The inventors of the present invention made it possible to deposit an autodeposition coating film having excellent corrosion resistance on the surface of a metallic material, by using a surface treatment solution for autodeposition coating treatment of metallic materials, which is an aqueous solution containing at least one tannin, at least one crosslinking agent having a crosslinking group capable of thermosetting reaction with a phenolic hydroxyl group and/or a phenolic nucleus, ferric ions, soluble type elemental fluorine, and an oxidizing agent, characterized in that the solids mass concentration ratio of tannin to the crosslinking agent is in the range of from 1:1 to 1:10, the molar concentration of the soluble elemental fluorine is at least 3-fold the molar concentration of the ferric ions, and the pH is from 2 to 6.

The surface treatment solution for autodeposition coating treatment of the present invention can be applied to metallic materials such as iron-based metallic materials and zinc-plated steel plates. However, the most suitable metallic material is an iron-based metallic material. The iron-based metallic material as used herein refers to an iron-based metal such as steel plate such as a cold rolled steel plate or a hot rolled steel plate, cast iron or a sintered material.

Uses of the metallic material of the present invention include automotive bodies, automotive parts, steel house furnishings and domestic electric appliances, and the autodeposition coating film of the present invention may be used alone, or in combination with other finish coatings such as solvent coating.

Examples of the tannin that can be used in the present invention include hydrolyzable tannins of chestnut, oak, eucalyptus, divi-divi, tara, oak, sumac, myrabolam, algarobilla, valonia, Chinese gall, and Turkish gall; condensed tannins such as quebracho, Burma cutch, wattle, spruce, hemlock, mangrove, oak bark, avaram, gambier, tea and persimmon; and synthetic tannin such as those disclosed in JP-A No. 61-4775.

Among them, a preferred form of tannin is hydrolysable tannin, and more preferred examples are tannins of Chinese gall and Turkish gall. Chinese gall in particular is not only easily available as an industrial raw material, but also provides the most suitable tannin in view of the depositability of the autodeposition coating film of the present invention, and the performance.

The complex forming reaction between tannin and metal ions has long been known, and surface treatment technologies making use of the complex forming reaction have already been disclosed. For example, the Patent Documents 8, 9 and 11 mentioned above relate to dry-in-place type surface treatment technologies utilizing a complex forming reaction between zinc ions and tannin, but the film thicknesses obtainable thereby are all less than 1 μm. On the contrary, although a complex forming reaction between tannin and metal ions, particularly iron ions, is utilized as the fundamental of the film deposition reaction in the present invention, a film thickness of several ten micrometers was successfully obtained, which had never been obtained previously, by combining tannin with other components.

A first component that is combined with tannin, is at least one crosslinking agent having a crosslinking group that is capable of thermosetting reaction with a phenolic hydroxyl group and/or a phenolic nucleus. The phenolic hydroxyl group as used herein represents a hydroxyl group of a phenol compound, and the phenolic nucleus represents the carbon atom at the ortho-position or para-position on the hydroxyl group of a phenol compound. Examples of the crosslinking group of the crosslinking agent that can be used include a methylol group, a carboxyl group, a glycidyl group, a secondary alcohol group resulting from the ring-opening of a glycidyl group, and an isocyanate group, and among them, an isocyanate group is preferred.

Furthermore, it is preferable that the crosslinking agent be a polyfunctional blocked isocyanate obtained by adding at least 2 moles of a polyisocyanate in which the isocyanate group at one end is blocked in advance with a blocking agent, to 1 mole of polyol. The isocyanate group can suppress the reaction with water when blocked with a blocking agent, and when heat is supplied, the blocking agent is dissociated to bring about a crosslinking reaction. Thus, the isocyanate group is most suitable as the crosslinking agent for the present invention.

Regarding the polyisocyanate to be used in the present invention, any known polyisocyanate can be used. Examples that can be used include aliphatic diisocyanates such as 1,4-tetramethylene diisocyanate, ethyl (2,6-diisocyanato)hexanoate, 1,6-hexamethylene diisocyanate, 1,12-dodecamethylene diisocyanate, and 2,2,4- or 2,4,4-trimethylhexamethylene diisocyanate; aliphatic triisocyanates such as 1,3,6-hexamethylene triisocyanate, 1,8-diisocyanato-4-isocyanatomethyloctane, and 2-isocyanatoethyl (2,6-diisocyanato)hexanoate; diisocyanates having a cyclic structure, such as isophorone diisocaynate; and aromatic diisocyanates such as m- or p-phenylene diisocyanate, toluene-2,4- or 2,6-diisocyanate, diphenylmethane-4,4'-diisocyanate, naphthalene-1,5-diisocyanate, diphenyl-4,4'-diisocyanate, 4,4'-diisocyanato-3,3'-dimethyldiphenyl, 3-methyldiphenylmethane-4,4'-diisocyanate, and diphenyl ether-4,4'-diisocyanate.

Examples of the polyisocyanate that are suitable for the present invention include, from the viewpoint of the flexibility of the film obtainable therefrom, 1,6-hexamethylene diisocyanate, and from the viewpoint of the reactivity of the isocyanate group, toluene-2,4- or 2,6-diisocyanate.

Regarding the blocking agent for the isocyanate group to be used in the present invention, any known blocking agent can be used. Examples thereof include alcohols such as methanol, ethanol, n-propyl alcohol, isopropyl alcohol, n-butyl alcohol, isobutyl alcohol, and tert-butyl alcohol; phenols such as phenol, methylphenol, chlorophenol, p-isobutylphenol, p-tert-butylphenol, p-isoamylphenol, p-octylphenol, and p-nonylphenol; active methylene compounds such as malonic acid dimethyl ester, malonic acid diethyl ester, acetylacetone, methyl acetoacetate and ethyl acetoacetate; oximes such as formaldoxime, acetaldoxime, acetone oxime, methyl ethyl ketone oxime, cyclohexanone oxime, acetophenone oxime, benzophenone oxime and 2-butanone oxime; lactams such as ε-caprolactam, δ-valerolactam and γ-butyrolactam; and thiosulfates.

The temperature for the baking of film in the autodeposition coating treatment of the present invention can be decreased by selecting a blocking agent having a low dissociation temperature of the isocyanate group. However, if the dissociation temperature is excessively low, there is a risk that the stability of the surface treatment solution for autodeposition coating treatment may be impaired. Thus, it is preferable to use oximes such as formaldoxime, acetaldoxime, acetone oxime, cyclohexanone oxime, acetophenone oxime, benzophenone oxime and 2-butanone oxime, and thiosulfates. Furthermore, the blocking agent used herein is such that when the polyisocyanate used is a diisocyanate, the blocking agent is preferably used in an amount 1/2 times the molar amount of the isocyanate group, and when the polyisocyanate is a triisocyanate, the blocking agent is preferably used in an amount 2/3 times the molar amount of the isocyanate group. As this blocking agent is used, the blocking agent suppresses the reaction between the crosslinking agent and water after the reaction with the polyol, and provides an effect of supplying heat to the autodeposition coating film prior to baking and thereby hardening the coating film, while maintaining the stability of the treatment solution for autodeposition surface treatment.

Examples of the polyol that can be used in the present invention include polypropylene glycol, polyethylene glycol, polytetramethylene glycol, a polyether polyol such as a copolymer of polyethylene glycol and polypropylene glycol; polyester polyols such as polyethylene adipate, polydiethylene adipate, polypropylene adipate, polytetramethylene adipate and poly-ε-caprolactone; polycarbonate polyol, acrylic polyol, epoxy polyol, trimethylolpropane, bisphenol A, bisphenol F and bisphenol AD.

Among them, an epoxy polyol having at least one molecule with the bisphenol A structure in the molecular structure, or bisphenol A is preferred. Here, the phrase "having at least one molecule with the bisphenol A structure" means that a polymer having the bisphenol A structure incorporated into the straight chain of a polymer such as the epoxy polyol, a polymer having a repeating unit of bisphenol A in some part, a homopolymer of bisphenol A, or bisphenol A itself. Bisphenol A has a benzene ring in the basic structure, and two benzene rings are linked via a methylene chain having two methyl groups joined together, and has therefore a structure having sturdiness (toughness) of the resin itself and high chemical resistance ($HO-C_6H_4-C(CH_3)_2-C_6H_4-OH$). Accordingly, when a polyol having the bisphenol A structure is used as the polyfunctional blocked isocyanate of the present invention, the corrosion resistance obtainable by the present invention is rapidly enhanced.

Furthermore, it is preferable that the at least one crosslinking agent be a self-emulsifying type blocked isocyanate which uses a polyether polyol as the polyol. At this time point, the detailed mechanism is not clearly known, but the inventors of the present invention found that by using a self-emulsifying type blocked isocyanate using a polyether polyol as the polyol, the speed of deposition of the autodeposition coating film according to the present invention is markedly increased. Here, the term "self-emulsifying type blocked isocyanate" implies that as a result of adding an anionic, cationic or nonionic hydrophilic group to a blocked isocyanate polymer molecule, the polymer molecule itself acquires affinity with water and can be emulsified and dispersed in water per se.

Here, examples of the polyether polyol that can be used include polypropylene glycol, polyethylene glycol, polytetramethylene glycol and a copolymer of polyethylene glycol and polypropylene glycol. Particularly, polyethylene glycol is suitable from the viewpoint of the balance between the water-solubility of the compound and the speed of deposition of the autodeposition coating film according to the present invention.

The concentration of at least one of the tannin is preferably 1% to 5% by mass, and more preferably 1% to 3% by mass, as the solids concentration in the aqueous solution. If the concentration is less than 1% by mass, sufficient autodeposition properties are not obtained, and an autodeposition film thickness that is sufficient to obtain the corrosion resistance, which is one of the effects of the present invention, cannot be obtained. Furthermore, if the concentration is greater than 5% by mass, not only there is an increase in the amount of consumption of the autodeposition bath components that is attributable to the taking out of the treatment solution by the object to be coated, but also since the taken out treatment solution is removed by a water rinsing process and is sent to a wastewater treatment process, an increase in the amount of unnecessary waste materials is brought about. Therefore, a more preferred upper limit concentration of tannin is 3% by mass.

The solids mass concentration ratio of tannin and the crosslinking agent in the surface treatment solution is preferably from 1:1 to 1:10, more preferably from 1:1 to 1:6, and even more preferably from 1:1 to 1:3. If the ratio of the crosslinking agent to tannin is less than 1, the crosslinking density is low, and sufficient corrosion resistance cannot be obtained. Furthermore, if the ratio is larger than 10, the crosslinking density is excessively high, causing the coating film to be brittle, which is not suitable for the practical use.

According to the present invention, a solvent component can be added to enhance the water-solubility of the components in the surface treatment solution, particularly the crosslinking agent, and to enhance the external appearance of the film obtainable after the hardening by baking. Examples of the solvent that is suitable for the present invention include ethylene glycol monoethyl ether, ethylene glycol monobutyl ether, ethylene glycol monohexyl ether, diethylene glycol monohexyl ether, and 2,2,4-trimethylpentanediol-1,3-monoisobutyrate.

The present invention relates to a surface treatment solution for autodeposition coating treatment. Here, in the autodeposition reaction according to the present invention, as a result of a dissolution reaction of an iron-based metallic material occurring because the pH is from 2 to 6, and of an oxidation reaction of metallic iron induced by ferric ions, the ferrous ions dissolved in the bath and the polyhydric phenol of tannin form a ferrous ion complex, and thereby the tannin is insolubilized and is deposited as an autodeposition coating film. Furthermore, when a self-emulsifying type blocked isocyanate using a polyether polyol as the polyol is used as a crosslinking agent, the autodeposition reaction is accelerated.

The excess ferrous ions that are not used in the autodeposition reaction are rapidly oxidized into ferric ions by the oxidizing agent present in the autodeposition treatment bath of the present invention. The oxidized ferric ions themselves may serve as a cause of impairing the stability of the autodeposition treatment bath, but as the dissolved elemental fluorine contained in the treatment bath of the present invention coordinates the ferric ions, the stability of the treatment bath is maintained.

Here, as the source of iron ions, soluble iron salts, for example, iron nitrate, iron sulfate and iron chloride can be used, and any of ferrous salts and ferric salts may be used because ferrous ions can be oxidized by the oxidizing agent in the surface treatment liquid for autodeposition coating treatment and thereby converted to ferric ions in the treatment solution. Furthermore, powdered iron, iron oxide, iron hydroxide and the like may also be used after being dissolved in hydrofluoric acid.

The concentration of the ferric ions to bring about the autodeposition reaction is 0.1 to 3 g/L, preferably 0.5 to 2.5 g/L, and more preferably 1 to 2 g/L. The concentration of the ferric ions can be measured by methods commonly used in the pertinent art, and for example, the concentration can be measured according to an atomic absorption method, an ICP emission spectrometry, or an EDTA-based chelation analysis, using a surface treatment solution for autodeposition coating treatment having the resin fraction preliminarily decomposed by means of acid and heating and separated. Furthermore, a preferred concentration of the soluble type elemental fluorine is at least 3-fold the molar concentration of the ferric ions. The upper limit is not particularly limited, but may be, for example, 10-fold or less the molar concentration of the ferric ions. The concentration of the soluble type elemental fluorine can be measured by methods commonly used in the pertinent art, and for example, after the solid particles in the surface treatment solution for autodeposition coating treatment of the present invention are removed by filtration, a distillation operation is further carried out, and the elemental fluorine concentration in the distillate can be measured by an ion chromatograph or a capillary electrophoretic apparatus. If the ferric ion concentration is less than 0.1 g/L, it is difficult to trigger the oxidation dissolution reaction of iron in an amount suitable for autodeposition. Furthermore, if the ferric ion concentration is larger than 3 g/L, the iron concentration that is taken in by the deposited autodeposition coating film, increases, and the amount of moisture taken in into the coating film together with iron ions increases. Thus, the autodeposition coating film is easily peeled off in the subsequent water rinsing processes.

As the source of the dissolved elemental fluorine, hydrofluoric acid, ammonium fluoride, acidic ammonium fluoride, sodium fluoride, sodium hydrogen difluoride, potassium fluoride, potassium hydrogen difluoride and the like can be used. Here, in the case of using a fluoride other than hydrofluoric acid, the pH of the surface treatment solution for autodeposition coating treatment may be adjusted by using an acid such as nitric acid or sulfuric acid.

The pH of the surface treatment solution for autodeposition coating treatment of the present invention is preferably 2 to 6, more preferably 2.5 to 5, and even more preferably 2.5 to 4. The method for pH measurement conforms to the method of JIS Z8802. The method for autodeposition coating treatment of the present invention is based on, as described above, a dissolution reaction of an iron-based metallic material induced by hydrofluoric acid in the surface treatment solution for autodeposition coating treatment, and an oxidation reaction of metallic iron induced by ferric ions. Therefore, if the pH is higher than 6, the dissolution reaction of the metallic material is difficult to occur, and the reduction reaction of ferric ions is also difficult to occur. Furthermore, if the pH is lower than 2, the dissolution reaction of the metallic material occurs to a larger extent than the deposition reaction of the autodeposition coating film, and as a result, there is a concern that the stability of the surface treatment solution for autodeposition coating treatment may be impaired.

The oxidizing agent is preferably at least one selected from perchloric acid, hypochlorous acid, dissolved oxygen, ozone, permanganic acid, and hydrogen peroxide. Hydrogen peroxide is easily available, and since a by-product of the reduction reaction of hydrogen peroxide is water, it is not necessary to consider the influence of hydrogen peroxide on the autodeposition coating treatment. Thus, hydrogen peroxide is an oxidizing agent suitable for the present invention.

The concentration of the oxidizing agent in the autodeposition treatment solution of the present invention can be regulated by the oxidation reduction potential that is measured with a commercially available ORP electrode which uses a platinum electrode as an operating electrode. Here, in view of the autodeposition reaction mechanism of the present invention, a state in which all of the ferrous ions have been oxidized into ferric ions and the oxidizing agent is present in excess in the treatment solution, is preferred. That is, the amount of the oxidizing agent is preferably an amount that is sufficient to oxidize all of the iron ions present in the bath and to maintain the oxidation state. The aforementioned state can be maintained by retaining the oxidation reduction potential at or above the minimum of the value provided by the selected oxidizing agent. Here, the oxidation reduction potential in the case of taking hydrogen peroxide as an example, is preferably at least 300 mV or greater, more preferably 350 mV or greater, and even more preferably 400 mV or greater. The upper limit is, without any particular limitations, 500 mV or less.

In addition, it is preferable that the surface treatment solution for autodeposition coating treatment of the present invention contain at least one selected from the group consisting of cerium fluoride, yttrium fluoride, aluminum fluoride and strontium fluoride, in an amount in the range of 0.1% to 10% by mass relative to the total solids concentration of tannin and the crosslinking agent.

Since the fluorides mentioned above have low solubility in an aqueous solution of hydrofluoric acid, the fluorides supplied to the surface treatment solution of the invention are mostly present in the form of solid particles in the surface treatment solution, and the fluorides are taken in into the coating film when an organic film is deposited by the autodeposition reaction. The fluoride particles thus taken in bring an enhancement of the corrosion resistance of the autodeposition coating film. Currently, the operating effect of the particles of fluoride is not clearly known, but it is speculated that when the fluoride particles are present in the coating film, the fluoride particles have an effect of slowing the rate at which the corrosion promoting components incorporated into the coating film reach the metal interface, and an effect of accelerating the crosslinking reaction between tannin and the crosslinking agent at the time of baking.

Regarding the at least one selected from the group consisting of cerium fluoride, yttrium fluoride, aluminum fluoride and strontium fluoride, a commercially available salt may be used, or the particles generated as a precipitate deposited when a soluble metal salt such as cerium nitrate is reacted with hydrofluoric acid, may also be used. Here, the thickness of the autodeposition coating layer of the present invention is preferably 10 to 50 µm. Therefore, the average particle size of the at least one selected from the group consisting of cerium fluoride, yttrium fluoride, aluminum fluoride and strontium fluoride is preferably 50 µm or less, and more preferably 10 µm or less. Furthermore, the lower limit of the average particle size of the fine particles of fluoride is preferably 0.1 µm, from the viewpoint of the action of slowing the rate of movement of the corrosion promoting components by the particles of fluoride.

The average particle size of the fluoride fine particles can be measured by using a commercially available laser scattering particle size distribution analyzer or a light scattering type particle size distribution analyzer.

The treatment solution for autodeposition coating treatment of the present invention can contain hexafluorozirconic acid and hexafluorotitanic acid as soluble components. These soluble components have an effect of further increasing the corrosion resistance of the autodeposition coating film of the invention, as zirconium or titanium precipitate out in the form of oxide or hydroxide when the interfacial pH increases during the deposition of the autodeposition coating film.

Furthermore, the method for autodeposition coating treatment of a metallic material of the present invention is carried out by preliminarily cleaning the surface of an iron-based metallic material through degreasing and water rinsing treatments, subsequently bringing the surface into contact with the aqueous solution described in connection with the method for autodeposition coating treatment, subsequently removing any excess aqueous solution adhering to the surface of the metallic material through a further water rinsing process, and then performing a baking treatment to thereby thermally harden the coating film. The baking temperature for the baking treatment is preferably 170° C. to 220° C., and more preferably 180° C. to 200° C.

Here, the degreasing treatment can be carried out using conventionally commonly used solvent degreasing, alkali degreasing, and the like, and there are no restrictions on the technique, which may include flowing off, spraying, immersion and electrolysis. Furthermore, there are no restrictions on the water rinsing treatment that is carried out after the degreasing treatment and after the autodeposition coating treatment, and the water rinsing treatment can be selected from flowing off, spraying, immersion and the like. There are no particular restrictions on the quality of the water used in water rinsing, but a preferred choice is ion-exchanged water, in consideration of the possible incorporation of trace components into the autodeposition coating treatment bath, and remaining of the components in the coating film.

The autodeposition coating treatment of the present invention is carried out according to an immersion method by which an object to be coated is immersed in a treatment bath. With regard to the treatment bath for performing the immersion method, the bath may be simply provided with stirring to the extent that the component concentration in the treatment bath is maintained uniformly.

There are no particular limitations on the time for immersing the metallic material to be treated in the autodeposition coating treatment tank in the autodeposition coating treatment of the present invention, but one of the effects of the present invention is the ability to deposit a coating film having a sufficient thickness in an industrially applicable short treatment time. Here, the immersion time for obtaining the autodeposition coating film of the present invention is preferably from 10 seconds to 10 minutes, more preferably from 30 seconds to 5 minutes, and even more preferably from 1 minute to 3 minutes.

Depending on the surface state of the material to be coated, an acid pickling process may also be employed. In that case, the treatment process includes degreasing → multistage water rinsing (normally 2 to 3 stages) → acid pickling → multistage water rinsing (normally 1 to 2 stages) → chemical conversion of autodeposition coating film → multistage water rinsing (normally 2 to 3 stages) → baking.

It is also possible to further increase corrosion resistance by combining post-treatment processes after the autodeposition coating treatment process. The treatment process in the case of using post-treatment processes includes degreasing → multistage water rinsing (normally 2 to 3 stages) → chemical conversion of autodeposition coating film → multistage water rinsing (normally 2 to 3 stages) → post-treatment → baking. Here, examples of the post-treatment components that can be used in the present invention include soluble salts of cerium, aluminum, cobalt, calcium, strontium and yttrium; and amines such as diethanolamine, triethanolamine, ethylenediamine, tetramethylenediamine, hexamethylenediamine, diethylenetriamine, polyethyleneimine, polyallylamine and polyvinylamine.

The present invention relates to an autodeposition coated metallic material having an autodeposition coating layer deposited on the surface of a metallic material according to the method described above, characterized in that the thickness of the autodeposition coating layer obtainable after hardening by baking is 10 to 50 µm. Within the range mentioned above, the metallic material has sufficient corrosion resistance and hardly has defective external appearance such as cracks or shrinkage.

EXAMPLES

Hereinafter, the effects of the treatment solution for autodeposition coating treatment, the method for autodeposition coating treatment and the autodeposition coating treated metallic material of the present invention will be specifically explained by way of Examples together with Comparative Examples. The metallic material to be treated, degreasing agent and coating material used in the Examples were arbitrarily selected from the commercially available materials, and these materials are not intended by any means to limit the combination of materials in the actual use of the method for autodeposition coating treatment and the autodeposition coating treated metallic material of the present invention.

(Test Plate)

The abbreviation and details of the test plate used in the Examples and Comparative Examples are shown below.

CRS (cold rolled steel plate: JIS-G-3141)

(Composition of Treatment Solution for Autodeposition Coating Treatment, and Treatment Process)

Production Example 1

Synthesis of Crosslinking Agent

In a dry nitrogen atmosphere, 87 g of 2-butanone oxime was added to 174 g of toluene diisocyanate (CORONATE T80; manufactured by Nippon Polyurethane Industry Co., Ltd.), while cooling the system from the outside so that the reaction temperature would not exceed 40° C. After the mixture was maintained for one hour at 40° C., the reaction vessel was heated to 70° C. To this, 113 g of bisphenol A (reagent) and 0.02 g of dibutyltin laurate (STANN BL; manufactured by Sankyo Yuki Gosei K.K.) were added, and the mixture was maintained at 120° C. for 2 hours. Subsequently, the mixture was diluted with ethylene glycol monobutyl ether (reagent) to a solids concentration of 30% by mass.

Production Example 2

Synthesis of Crosslinking Agent

In a dry nitrogen atmosphere, 87 g of 2-butanone oxime was added to 174 g of toluene diisocyanate (CORONATE T80; manufactured by Nippon Polyurethane Industry Co., Ltd.), while cooling the system from the outside so that the reaction temperature would not exceed 40° C. After the mixture was maintained for one hour at 40° C., the reaction vessel was heated to 70° C. To this, 45 g of 1,1,1-tris(hydroxymethyl)propane (reagent) and 0.02 g of dibutyltin laurate (STANN BL; manufactured by Sankyo Yuki Gosei K.K.) were added, and the mixture was maintained at 120° C. for 2 hours. Subsequently, the mixture was diluted with ethylene glycol monobutyl ether (reagent) to a solids concentration of 30% by mass.

Examples 1 to 5 and Comparative Example 1

A liquid prepared by diluting FINE CLEANER L4460 (manufactured by Nihon Parkerizing Co., Ltd.), which is a commercially available alkali degreasing agent, with water to 2% by mass and heated to 40° C., was sprayed onto the test plate with a spray apparatus, and thereby a degreasing treatment was performed. The surface of the test plate after the degreasing treatment was washed with ion-exchanged water using a spray apparatus. The test plate having the surface degreased and washed, was immersed in an autodeposition coating treatment bath indicated in Table 1, which was prepared using commercially available Chinese gall tannin (trade name: TANNIC ACID AL; manufactured by Fuji Chemical Industry Co., Ltd.), the crosslinking agent of Production Example 1 as a crosslinking agent A, a commercially available polyethylene glycol self-emulsifying type blocked isocyanate (trade name: TAKENATE WB-920; manufactured by Mitsui Chemicals Polyurethane, Inc.) as a crosslinking agent B, powdered iron (reagent), hydrofluoric acid (reagent), and aqueous hydrogen peroxide (reagent). Subsequently, the test plate was washed with ion-exchanged water using a spray apparatus, and then the test plate was subjected to baking for 20 minutes at 180° C. The immersion time in the autodeposition bath was set up so that a film thickness of 15 μm was obtained. The respective autodeposition coated metallic materials obtained in the Examples and Comparative Examples were evaluated according to the methods described below.

Examples 6 to 9 and Comparative Examples 2 and 3

A liquid prepared by diluting FINE CLEANER L4460 (manufactured by Nihon Parkerizing Co., Ltd.), which is a commercially available alkali degreasing agent, with water to 2% by mass and heated to 40° C., was sprayed onto the test plate with a spray apparatus, and thereby a degreasing treatment was performed. The surface of the test plate after the degreasing treatment was washed with ion-exchanged water using a spray apparatus. The test plate having the surface degreased and washed, was immersed in an autodeposition coating treatment bath indicated in Table 2, which was prepared using commercially available Chinese gall tannin (trade name: TANNIC ACID AL; manufactured by Fuji Chemical Industry Co., Ltd.), the crosslinking agent of Production Example 2 as a crosslinking agent A, a commercially available polyethylene glycol self-emulsifying type blocked isocyanate (trade name: TAKENATE WB-920; manufactured by Mitsui Chemicals Polyurethane, Inc.) as a crosslinking agent B, powdered iron (reagent), hydrofluoric acid (reagent), and aqueous hydrogen peroxide (reagent). Subsequently, the test plate was washed with ion-exchanged water using a spray apparatus, and then the test plate was subjected to baking for 20 minutes at 180° C. Furthermore, the test plate was subjected to a commercially available aminoalkyd-based intermediate coat coating (trade name: AMILAC TP-37 GRAY; manufactured by Kansai Paint Co. Ltd., thickness 35 μm, spray coating, baked at 140° C. for 20 minutes), and a commercially available aminoalkyd-based overcoat coating (trade name: AMILAC TM-13 WHITE; manufactured by Kansai Paint Co., Ltd., thickness 35 μm, spray coating, baked at 140° C. for 20 minutes). The respective autodeposition coated metallic materials obtained in the Examples and Comparative Examples were evaluated according to the methods described below.

Examples 10 to 12

A liquid prepared by diluting FINE CLEANER L4460 (manufactured by Nihon Parkerizing Co., Ltd.), which is a commercially available alkali degreasing agent, with water to 2% by mass and heated to 40° C., was sprayed onto the test plate with a spray apparatus, and thereby a degreasing treatment was performed. The surface of the test plate after the degreasing treatment was washed with ion-exchanged water using a spray apparatus. The test plate having the surface degreased and washed, was immersed for 2 minutes in an autodeposition coating treatment bath indicated in Table 3, which was prepared using commercially available Chinese gall tannin (trade name: TANNIC ACID AL; manufactured by Fuji Chemical Industry Co., Ltd.), a commercially available water-soluble blocked isocyanate (trade name: ELASTRON H38; manufactured by Daiichi Kogyo Seiyaku Co., Ltd.) as a crosslinking agent A, a commercially available polyethylene glycol self-emulsifying type blocked isocyanate (trade name: TAKENATE WB-920; manufactured by Mitsui Chemicals Polyurethane, Inc.) as a crosslinking agent B, powdered iron (reagent), hydrofluoric acid (reagent), and aqueous hydrogen peroxide (reagent). Subsequently, the test plate was washed with ion-exchanged water using a spray apparatus, and then the test plate was subjected to baking for 20 minutes at 180° C. Furthermore, the test plate was subjected to a commercially available aminoalkyd-based intermediate coat coating (trade name: AMILAC TP-37 GRAY; manufactured by Kansai Paint Co. Ltd., thickness 35 μm, spray coating, baked at 140° C. for 20 minutes), and a commercially available aminoalkyd-based overcoat coating (trade name: AMILAC TM-13 WHITE; manufactured by Kansai Paint Co., Ltd., thickness 35 μm, spray coating, baked at 140° C. for 20 minutes). The respective autodeposition coated metallic materials obtained in the Examples and Comparative Examples were evaluated according to the methods described below.

Comparative Example 4

A liquid prepared by diluting FINE CLEANER L4460 (manufactured by Nihon Parkerizing Co., Ltd.), which is a commercially available alkali degreasing agent, with water to 2% by mass and heated to 40° C., was sprayed onto the test plate with a spray apparatus, and thereby a degreasing treatment was performed. The surface of the test plate after the degreasing treatment was washed with ion-exchanged water using a spray apparatus. The test plate having the surface degreased and washed, was immersed for 2 minutes in an autodeposition coating treatment bath indicated in Table 3, which was prepared using commercially available Chinese gall tannin (trade name: TANNIC ACID AL; manufactured by Fuji Chemical Industry Co., Ltd.), a commercially available water-soluble blocked isocyanate (trade name: ELASTRON H38; manufactured by Daiichi Kogyo Seiyaku Co., Ltd.) as a crosslinking agent A, a commercially available polyethylene glycol self-emulsifying type blocked isocyanate (trade name: TAKENATE WB-920; manufactured by Mitsui Chemicals Polyurethane, Inc.) as a crosslinking agent B, ferric chloride (reagent), powdered iron (reagent), hydrofluoric acid (reagent) and aqueous hydrogen peroxide (reagent). Subsequently, the test plate was washed with ion-exchanged water using a spray apparatus, and then the test plate was subjected to baking for 20 minutes at 180° C. The mixing proportions of ferric chloride and powdered iron were 1 g/L of ferric chloride in terms of iron content, with the rest of the iron content being the powdered iron. Furthermore, the test plate was subjected to a commercially available aminoalkyd-based intermediate coat coating (trade name: AMILAC TP-37 GRAY; manufactured by Kansai Paint Co. Ltd., thickness 35 μm, spray coating, baked at 140° C. for 20 minutes), and a commercially available aminoalkyd-based overcoat coating (trade name: AMILAC TM-13 WHITE; manufactured by Kansai Paint Co., Ltd., thickness 35 μm, spray coating, baked at 140° C. for 20 minutes). The respective autodeposition coated metallic materials obtained in the Examples and Comparative Examples were evaluated according to the methods described below.

Examples 13 to 15

A liquid prepared by diluting FINE CLEANER L4460 (manufactured by Nihon Parkerizing Co., Ltd.), which is a commercially available alkali degreasing agent, with water to 2% by mass and heated to 40° C., was sprayed onto the test plate with a spray apparatus, and thereby a degreasing treatment was performed. The surface of the test plate after the degreasing treatment was washed with ion-exchanged water using a spray apparatus. The test plate having the surface degreased and washed, was immersed for 2 minutes in an autodeposition coating treatment bath indicated in Table 4, which was prepared using commercially available Chinese gall tannin (trade name: TANNIC ACID AL; manufactured by Fuji Chemical Industry Co., Ltd.), a commercially available water-soluble blocked isocyanate (trade name: ELASTRON H38; manufactured by Daiichi Kogyo Seiyaku Co., Ltd.) as a crosslinking agent A, a commercially available polyethylene glycol self-emulsifying type blocked isocyanate (trade name: TAKENATE WB-920; manufactured by Mitsui Chemicals Polyurethane, Inc.) as a crosslinking agent B, powdered iron (reagent), hydrofluoric acid (reagent), aqueous hydrogen peroxide (reagent), cerium fluoride (reagent) and aluminum fluoride (reagent). Subsequently, the test plate was washed with ion-exchanged water using a spray apparatus, and then the test plate was subjected to baking for 20 minutes at 180° C. The concentration of the fluoride particles in the Table 4 indicates the mass percentage relative to the solids content in the surface treatment solution for autodeposition coating treatment. The cerium and aluminum fluoride reagents were pulverized in advance with a sand mill using zirconia beads, and the average particle size was measured with a laser diffraction/scattering type particle size distribution analyzer (LA-920; manufactured by Horiba, Ltd.). As a result, their average particle sizes were found to be 5.8 μm and 8.2 μm, respectively. Furthermore, the test plate was subjected to a commercially available aminoalkyd-based intermediate coat coating (trade name: AMILAC TP-37 GRAY; manufactured by Kansai Paint Co. Ltd., thickness 35 μm, spray coating, baked at 140° C. for 20 minutes), and a commercially available aminoalkyd-based overcoat coating (trade name: AMILAC TM-13 WHITE; manufactured by Kansai Paint Co., Ltd., thickness 35 μm, spray coating, baked at 140° C. for 20 minutes). The respective autodeposition coated metallic materials obtained in the Examples and Comparative Examples were evaluated according to the methods described below.

Comparative Example 5

A liquid prepared by diluting FINE CLEANER L4460 (manufactured by Nihon Parkerizing Co., Ltd.), which is a commercially available alkali degreasing agent, with water to 2% by mass and heated to 40° C., was sprayed onto the test plate with a spray apparatus, and thereby a degreasing treatment was performed. The surface of the test plate after the degreasing treatment was washed with ion-exchanged water using a spray apparatus. The test plate having the surface degreased and washed, was immersed for 5 minutes in an autodeposition coating treatment bath prepared using 6% by mass, in terms of solids content, of commercially available Chinese gall tannin (trade name: TANNIC ACID AL; manufactured by Fuji Chemical Industry Co., Ltd.), 1.5 g/L of powdered iron (reagent), 1.6 g/L, in terms of fluorine, of hydrofluoric acid (reagent), and aqueous hydrogen peroxide (reagent), with the ORP adjusted to 400 mV. Subsequently, the test plate was washed with ion-exchanged water using a spray apparatus, and then the test plate was subjected to baking for 20 minutes at 180° C. The autodeposition coated metallic material thus obtained was evaluated according to the methods described below.

Comparative Example 6

A liquid prepared by diluting FINE CLEANER L4460 (manufactured by Nihon Parkerizing Co., Ltd.), which is a commercially available alkali degreasing agent, with water to 2% by mass and heated to 40° C., was sprayed onto the test plate with a spray apparatus, and thereby a degreasing treatment was performed. The surface of the test plate after the degreasing treatment was washed with ion-exchanged water using a spray apparatus. The test plate having the surface degreased and washed, was immersed for 2 minutes in a treatment bath prepared using a commercially available autodeposition coating treatment agent, NSD-1000 (vinylidene chloride type; manufactured by Nihon Parkerizing Co., Ltd.) based on the catalogue values. Subsequently, the test plate was washed with ion-exchanged water using a spray apparatus, and then the test plate was subjected to baking for 20 minutes at 100° C. Furthermore, the test plate was subjected to a commercially available aminoalkyd-based intermediate coat coating (trade name: AMILAC TP-37 GRAY; manufactured by Kansai Paint Co. Ltd., thickness 35 µm, spray coating, baked at 140° C. for 20 minutes), and a commercially available aminoalkyd-based overcoat coating (trade name: AMILAC TM-13 WHITE; manufactured by Kansai Paint Co., Ltd., thickness 35 µm, spray coating, baked at 140° C. for 20 minutes). The adhesiveness of the coating film of the overcoated test plate was evaluated according to the method described below.

(Evaluation of External Appearance and Film Thickness of Autodeposition Coating Treated Metallic Material)

The external appearance of the test plates that had been treated using the surface treatment solutions for autodeposition coating treatment of the Examples and Comparative Examples, was judged by visual inspection. Furthermore, the film thickness was measured using an electromagnetic thickness meter (FISCHERSCOPE MMS; manufactured by Fischer Technology, Inc.).

(Evaluation of Performance of Autodeposition Coated Metallic Material)

An evaluation of the performances of the Examples and Comparative Examples was carried out. The evaluation items and abbreviations are shown below. Here, a film obtained by subjecting an autodeposition coating film after the completion of baking, to autodeposition coating, overcoat coating and then baking, will be referred to as 3-coat coating.

(1) SST: Salt spray test (autodeposition coating)

(2) SDT: Hot salt water test (autodeposition coating)

(3) $1^{st}$ ADH: Primary adhesiveness (3-coat coating)

(4) $2^{nd}$ ADH: Water resistant secondary adhesiveness (3-coat coating)

SST

An autodeposition coated plate having crosscuts inserted with a sharp cutter, was sprayed for 1000 hours with a 5 mass % salt water (according to JIS-Z-2371). After completion of the spraying, the maximum blister width on both sides from the crosscut section was measured.

SDT

An autodeposition coated plate having crosscuts inserted with a sharp cutter, was immersed for 240 hours in a 5 mass % aqueous NaCl solution which had been heated to 50° C. After completion of the immersion, the crosscut section that had been washed with tap water and then dried at normal temperature, was peeled off with an adhesive tape, and the maximum peeling width on both sides of the coating was measured.

$1^{st}$ ADH

A 3-coat coating was cut with a sharp cutter, to have one hundred grid squares inserted at an interval of 2 mm. The grid section was peeled off with an adhesive tape, and the number of remaining grid squares was counted.

$2^{nd}$ ADH

A 3-coat coated plate was immersed in deionized water at 40° C. for 240 hours. After the immersion, the 3-coat coated plate was cut with a sharp cutter to have 100 grid squares inserted at an interval of 2 mm. The grid section was peeled off with an adhesive tape, and the number of remaining grid squares was counted.

Table 5 presents the evaluation results for the autodeposition coating films obtained in Examples 1 to 5 and Comparative Example 1. In the Examples 1 to 5, a uniform external appearance was obtained at all levels, and the corrosion resistance was also excellent. On the other hand, Comparative Example 1 had cracks generated over the entire surface of the autodeposition coating film after baking, and therefore, the evaluation on corrosion resistance was not carried out.

Table 6 presents the evaluation results for the autodeposition coating films obtained in Examples 6 to 9 and Comparative Examples 2 and 3. In the Examples 6 to 9, since the crosslinking agent did not have the bisphenol A structure introduced therein, these Examples exhibited practically sufficient corrosion resistance, which was though slightly inferior as compared with the Examples 1 to 5. Furthermore, the adhesiveness obtainable after the intermediate coat coating was also satisfactory. On the other hand, the autodeposition coated metallic material of Comparative Example 2 acquired adhesiveness, but the film thickness was low, which resulted in inferior corrosion resistance. In Comparative Example 3, cracks occurred at the edges of the autodeposition coating film obtained after baking, and therefore, the evaluation on corrosion resistance was not carried out.

Table 7 presents the evaluation results for the autodeposition coating films obtained in Examples 10 to 12 and Comparative Example 4. In the Examples 10 to 12, a uniform external appearance was obtained at all levels, and the corrosion resistance was also excellent. Furthermore, the adhesiveness obtainable after the intermediate coat coating was also satisfactory. On the other hand, in Comparative Example 4, the coating prior to baking was peeled off during the water rinsing process, which was the process subsequent to the autodeposition coating treatment process.

Table 8 presents the evaluation results for the autodeposition coating film obtained in Examples 13 to 15. The results of the current Examples clearly indicate the corrosion resistance enhancing effect resulting from the addition of fluoride particles. Particularly, markedly enhanced corrosion resistance was exhibited in the SDT test.

Table 9 presents the evaluation results for the autodeposition coating film obtained in Comparative Example 5. In the Comparative Example 5, an autodeposition coating film was produced; however, since a crosslinking agent was not put to use, the results showed a noticeably low thickness, a non-uniform external appearance, and inferior corrosion resistance.

Table 10 presents the evaluation results for the autodeposition coating film obtained in Comparative Example 6. Since the Comparative Example 6 used a commercially available autodeposition coating treating agent, the autodeposition coating film exhibited relative satisfactory corrosion resistance. However, in the evaluation on the adhesiveness obtained after the intermediate coat coating, the coating at the grid section was entirely peeled off.

The above results clearly manifest the effects of the present invention.

TABLE 1

| | Tannin Solids content mass % | Crosslinking agent A Solids content mass % | Crosslinking agent B Solids content mass % | $Fe^{3+}$ g/L | $F/Fe^{3+}$ Molar ratio | pH | ORP mV |
|---|---|---|---|---|---|---|---|
| Example 1 | 1 | 5 | 0 | 1.5 | 3.1 | 3.2 | 400 |
| Example 2 | 2 | 4 | 0 | 1.5 | 3.1 | 3.2 | 400 |
| Example 3 | 5 | 5 | 0 | 1.5 | 3.1 | 3.2 | 400 |
| Example 4 | 2 | 2 | 2 | 1.5 | 3.1 | 3.2 | 350 |
| Example 5 | 2 | 2 | 2 | 1.5 | 3.1 | 3.2 | 300 |
| Comparative Example 1 | 1 | 12 | 0 | 1.5 | 3.1 | 3.2 | 400 |

TABLE 2

| | Tannin Solids content mass % | Crosslinking agent A Solids content mass % | Crosslinking agent B Solids content mass % | $Fe^{3+}$ g/L | $F/Fe^{3+}$ Molar ratio | pH | ORP mV | Treatment time Minute |
|---|---|---|---|---|---|---|---|---|
| Example 6 | 2 | 2 | 2 | 1.5 | 3.1 | 3.2 | 400 | 1 |
| Example 7 | 2 | 2 | 2 | 1.5 | 3.1 | 3.2 | 400 | 3 |
| Example 8 | 2 | 2 | 2 | 1.5 | 3.1 | 3.2 | 400 | 5 |
| Example 9 | 2 | 2 | 2 | 1.5 | 3.1 | 3.2 | 400 | 10 |
| Comparative Example 2 | 2 | 4 | 0 | 1.5 | 3.1 | 3.2 | 400 | 30 sec |
| Comparative Example 3 | 2 | 2 | 2 | 1.5 | 3.1 | 3.2 | 400 | 15 |

TABLE 3

| | Tannin Solids content mass % | Crosslinking agent A Solids content mass % | Crosslinking agent B Solids content mass % | $Fe^{3+}$ g/L | $F/Fe^{3+}$ Molar ratio | pH | ORP mV |
|---|---|---|---|---|---|---|---|
| Example 10 | 2 | 2 | 2 | 0.5 | 3.1 | 4.5 | 400 |
| Example 11 | 2 | 2 | 2 | 1.5 | 3.1 | 3.3 | 400 |
| Example 12 | 2 | 2 | 2 | 2.5 | 4.0 | 2.3 | 400 |
| Comparative Example 4 | 2 | 2 | 2 | 3.5 | 2.2 | 2.0 | 400 |

TABLE 4

| | Tannin Solids content mass % | Crosslinking agent A Solids content mass % | Crosslinking agent B Solids content mass % | $Fe^{3+}$ g/L | $F/Fe^{3+}$ Molar ratio | pH | ORP mV | Fluoride particles Type | Fluoride particles Mass % |
|---|---|---|---|---|---|---|---|---|---|
| Example 13 | 2 | 2 | 2 | 1.5 | 3.1 | 3.3 | 400 | $CeF_3$ | 0.1 |
| Example 14 | 2 | 2 | 2 | 1.5 | 3.1 | 3.3 | 400 | $CeF_3$ | 5.0 |
| Example 15 | 2 | 2 | 2 | 1.5 | 3.1 | 3.3 | 400 | $AlF_3$ | 2.0 |

TABLE 5

| | Appearance | Treatment time to reach a film thickness of 15 μm (minutes) | SST blister width (mm) | SDT peeling width (mm) |
|---|---|---|---|---|
| Example 1 | Uniform black | 10 | 4.5 | 1.8 |
| Example 2 | Uniform black | 8 | 3.8 | 1.6 |
| Example 3 | Uniform black | 6 | 5.9 | 4.1 |
| Example 4 | Uniform black | 2 | 3.9 | 1.7 |
| Example 5 | Uniform black | 2 | 4.0 | 1.8 |
| Comparative Example 1 | Cracking over entire surface | 15 | | |

TABLE 6

|  | Appearance | Thickness (μm) | SST blister width (mm) | SDT peeling width (mm) | $1^{st}$ ADH | $2^{nd}$ ADH |
|---|---|---|---|---|---|---|
| Example 6 | Uniform black | 12 | 5.9 | 5.6 | 100 | 100 |
| Example 7 | Uniform black | 18 | 5.0 | 5.5 | 100 | 100 |
| Example 8 | Uniform black | 25 | 4.5 | 4.1 | 100 | 100 |
| Example 9 | Uniform black | 29 | 3.9 | 2.5 | 100 | 100 |
| Comparative Example 2 | Uniform black | 7 | 20< | 20< | 100 | 100 |
| Comparative Example 3 | Cracking | 55 | | | | |

TABLE 7

|  | Appearance | Thickness (μm) | SST blister width (mm) | SDT peeling width (mm) | $1^{st}$ ADH | $2^{nd}$ ADH |
|---|---|---|---|---|---|---|
| Example 10 | Uniform black | 11 | 3.1 | 1.7 | 100 | 100 |
| Example 11 | Uniform black | 17 | 2.8 | 1.5 | 100 | 100 |
| Example 12 | Uniform black | 19 | 2.2 | 1.1 | 100 | 100 |
| Comparative Example 4 | Peeling upon immersion in water | | | | | |

TABLE 8

|  | Appearance | Thickness (μm) | SST blister width (mm) | SDT peeling width (mm) | $1^{st}$ ADH | $2^{nd}$ ADH |
|---|---|---|---|---|---|---|
| Example 13 | Uniform black | 17 | 3.2 | 0.5 | 100 | 100 |
| Example 14 | Uniform black | 16 | 3.0 | 0 | 100 | 100 |
| Example 15 | Uniform black | 16 | 3.0 | 0.8 | 100 | 100 |

TABLE 9

|  | Appearance | Thickness (μm) | SST blister width (mm) | SDT peeling width (mm) |
|---|---|---|---|---|
| Comparative Example 5 | Large exposure of base | 1> | 20< | 20< |

TABLE 10

|  | Appearance | Thickness (μm) | SST swelling width (mm) | SDT peeling width (mm) | $1^{st}$ ADH | $2^{nd}$ ADH |
|---|---|---|---|---|---|---|
| Comparative Example 6 | Uniform black | 16 | 5.2 | 2.2 | 0 | 0 |

What is claimed is:

1. A surface treatment solution for autodeposition coating treatment of a metallic material, comprising an aqueous solution comprising:

at least one tannin;

at least one crosslinking agent having a crosslinking group capable of thermosetting reaction with a phenolic hydroxyl group and/or a phenolic nucleus;

ferric ions;

soluble elemental fluorine comprising hydrofluoric acid;

at least one fluoride selected from the group consisting of cerium fluoride, yttrium fluoride, aluminum fluoride and strontium fluoride; said at least one fluoride having low solubility in an aqueous solution of hydrofluoric acid, and being present in an amount in the surface treatment solution such that said at least one fluoride is mostly present in a form of solid particles;

and an oxidizing agent;

wherein a solids mass concentration ratio of the tannin to the crosslinking agent ranges from 1:1 to 1:10, a molar concentration of the soluble elemental fluorine is at least 3 times molar concentration of the ferric ions, and the solution has a pH of from 2.3 to 6.

2. The surface treatment solution for autodeposition coating treatment of a metallic material according to claim 1, wherein the crosslinking group capable of thermosetting reaction of the at least one crosslinking agent is an isocyanate group.

3. The surface treatment solution for autodeposition coating treatment of a metallic material according to claim 2, wherein the at least one crosslinking agent is a polyfunctional blocked isocyanate obtained by adding at least 2 moles of a polyisocyanate in which the isocyanate group at one end is blocked in advance with a blocking agent, relative to 1 mole of a polyol.

4. The surface treatment solution for autodeposition coating treatment of a metallic material according to claim 3, wherein the polyol in the at least one crosslinking agent has at least one molecule with a bisphenol A structure.

5. The surface treatment solution for autodeposition coating treatment of a metallic material according to claim 3, wherein the at least one crosslinking agent is a self-emulsifying blocked isocyanate which uses a polyether polyol as the polyol.

6. The surface treatment solution for autodeposition coating treatment of a metallic material according to claim 1, wherein concentration of the at least one tannin is 1% to 5% by mass as solids concentration in the aqueous solution.

7. The surface treatment solution for autodeposition coating treatment of a metallic material according to claim 1, wherein the oxidizing agent is at least one selected from perchloric acid, hypochlorous acid, dissolved oxygen, ozone, permanganic acid and hydrogen peroxide.

8. The surface treatment solution for autodeposition coating treatment of a metallic material according to claim 7, wherein the surface treatment solution has an oxidation reduction potential measured with a platinum electrode of from 300 to 500 mV.

9. The surface treatment solution for autodeposition coating treatment of a metallic material according to claim 1, wherein the at least one fluoride present in the form of solid particles and selected from the group consisting of cerium fluoride, yttrium fluoride, aluminum fluoride and strontium fluoride is present in an amount ranging from 0.1% to 10% by mass relative to the total solids concentration of tannin and the crosslinking agent.

10. A method for autodeposition coating treatment of a metallic material, the method comprising:
preliminarily cleaning a surface of a metallic material through degreasing and water rinsing treatments;
contacting the surface of the metallic material with the surface treatment solution according to claim 1 thereby forming an autodeposition coating layer thereon,
subsequently removing excess treatment solution adhering to the surface of the metallic material through a further water rinsing process, and
then performing a baking treatment to thereby thermally harden the autodeposition coating layer.

11. The method for autodeposition coating treatment according to claim 10, wherein the metallic material is an iron-based metallic material.

12. An autodeposition coated metallic material comprising an autodeposition coating layer deposited by the method according to claim 10, wherein thickness of the autodeposition coating layer obtained after hardening by baking is from 10 to 50 μm.

13. The surface treatment solution for autodeposition coating treatment of a metallic material according to claim 1, wherein the solid particles of the at least one fluoride have an average particle size of 50 microns or less.

14. The surface treatment solution for autodeposition coating treatment of a metallic material according to claim 1, wherein the solid particles of the at least one fluoride have an average particle size of 10 microns or less.

15. The surface treatment solution for autodeposition coating treatment of a metallic material according to claim 14, wherein the solid particles of the at least one fluoride have an average particle size having a lower limit of 0.1 microns.

16. The surface treatment solution for autodeposition coating treatment of a metallic material according to claim 15, wherein said solid particles of the at least one fluoride having the average particle size having a lower limit of 0.1 microns are present in an amount ranging from 0.1% to 10% by mass relative to the total solids concentration of tannin and the crosslinking agent.

17. A surface treatment solution for autodeposition coating treatment of a metallic material, comprising an aqueous solution comprising:
at least one tannin present in an amount of 1% to 5 wt%;
at least one crosslinking agent having a crosslinking group capable of thermosetting reaction with a phenolic hydroxyl group and/or a phenolic nucleus;
ferric ions;
soluble elemental fluorine;
and an oxidizing agent;
wherein a solids mass concentration ratio of the tannin to the crosslinking agent ranges from 1:1 to 1:10, a molar concentration of the soluble elemental fluorine is at least 3 times molar concentration of the ferric ions, and the solution has a pH of from 2 to 6.

18. The surface treatment solution for autodeposition coating treatment of a metallic material according to claim 17, wherein the soluble elemental fluorine comprises hydrofluoric acid, said surface treatment solution further comprising at least one fluoride having low solubility in an aqueous solution of hydrofluoric acid, and being present in an amount in the surface treatment solution such that said at least one fluoride is mostly present in a form of solid particles having an average particle size of 50 microns or less and selected from the group consisting of cerium fluoride, yttrium fluoride, aluminum fluoride and strontium fluoride.

19. The surface treatment solution for autodeposition coating treatment of a metallic material according to claim 18, wherein said solid particles having the average particle size of 50 microns or less and selected from the group consisting of cerium fluoride, yttrium fluoride, aluminum fluoride and strontium fluoride are present in an amount ranging from 0.1% to 10% by mass relative to the total solids concentration of tannin and the crosslinking agent.

* * * * *